(12) United States Patent
Adam et al.

(10) Patent No.: US 10,239,451 B1
(45) Date of Patent: Mar. 26, 2019

(54) SYSTEMS AND METHODS FOR PROVIDING RELATIVE LANE ASSIGNMENT OF OBJECTS AT DISTANCES FROM THE VEHICLE

(71) Applicant: GM GLOBAL TECHNOLOGY OPERATIONS LLC, Detroit, MI (US)

(72) Inventors: Paul A. Adam, Milford, MI (US); Dmitriy Feldman, West Bloomfield, MI (US); Benjamin T. Llewellyn, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 64 days.

(21) Appl. No.: 15/695,396

(22) Filed: Sep. 5, 2017

(51) Int. Cl.
*B60Q 9/00* (2006.01)
*G08G 1/16* (2006.01)

(52) U.S. Cl.
CPC ............. *B60Q 9/008* (2013.01); *G08G 1/167* (2013.01)

(58) Field of Classification Search
CPC ................................ B60Q 9/008; G08G 1/167
USPC ........................................................ 340/435
See application file for complete search history.

(56) References Cited

U.S. PATENT DOCUMENTS

| | | | | |
|---|---|---|---|---|
| 9,494,438 B1* | 11/2016 | Ichinokawa | ............ | G01C 21/30 |
| 10,126,423 B1* | 11/2018 | Fowler | .................. | G01S 13/931 |
| 2012/0271483 A1* | 10/2012 | Samukawa | ........... | B60W 50/14 701/1 |
| 2013/0054128 A1* | 2/2013 | Moshchuk | ............. | G08G 1/167 701/301 |
| 2013/0211689 A1* | 8/2013 | Mizutani | ................ | B60K 31/00 701/96 |
| 2013/0338877 A1* | 12/2013 | Straus | ..................... | G08G 1/161 701/41 |
| 2014/0032049 A1* | 1/2014 | Moshchuk | ......... | B62D 15/0265 701/42 |
| 2014/0044311 A1* | 2/2014 | Takahashi | .............. | G08G 1/166 382/103 |
| 2014/0118182 A1* | 5/2014 | Oh | ......................... | G01S 13/867 342/52 |
| 2015/0371542 A1* | 12/2015 | Fujishiro | ............... | B60W 50/14 701/41 |
| 2016/0098926 A1* | 4/2016 | Probert | ................... | G01S 19/17 340/903 |
| 2016/0107682 A1* | 4/2016 | Tan | ......................... | B62D 6/00 701/41 |

(Continued)

*Primary Examiner* — Benyam Haile
*Assistant Examiner* — Kam Wan Ma

(57) ABSTRACT

A system for a vehicle operating on a road includes a vehicle placement module that references, based on a geographic position of the vehicle, a road mapping database to identify a selected lane of the road where the vehicle is located. A lane assignment module (i) receives information indicating identification of an object in the road and (ii) determines a relative lane of the object with respect to the selected lane. A curvature plotting module determines a curvature line of the selected lane. An object placement module (i) determines a first distance value representing a shortest distance between the object and the curvature line and (ii) determines whether the relative lane of the object is the selected lane based on the first distance value and a lane width value. An alert generation module selectively generates an alert signal in response to the object being in the selected lane.

18 Claims, 7 Drawing Sheets

(56) References Cited

U.S. PATENT DOCUMENTS

| | | | |
|---|---|---|---|
| 2016/0194000 A1* | 7/2016 | Taki | B60T 7/22 |
| | | | 701/70 |
| 2016/0238705 A1* | 8/2016 | Mukai | G01S 13/931 |
| 2016/0280264 A1* | 9/2016 | Baek | B62D 15/0255 |
| 2016/0327948 A1* | 11/2016 | Taguchi | G01C 25/00 |
| 2017/0101097 A1* | 4/2017 | Buchner | B60W 30/12 |
| 2017/0253181 A1* | 9/2017 | Choi | B60Q 9/008 |
| 2017/0307733 A1* | 10/2017 | Stainvas Olshansky | |
| | | | G01S 13/87 |
| 2017/0313312 A1* | 11/2017 | Park | G06K 9/00825 |
| 2018/0106906 A1* | 4/2018 | Mikami | G01S 19/07 |
| 2018/0284265 A1* | 10/2018 | Bilik | B60W 30/08 |

\* cited by examiner

SYSTEMS AND METHODS FOR PROVIDING RELATIVE LANE ASSIGNMENT OF OBJECTS AT DISTANCES FROM THE VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicular sensing of surrounding objects and more particularly to systems and methods for identifying objects in the roadway on which the vehicle is operating.

A vehicle may include one or more sensors to identify objects (for example, other vehicles) in front of or to the rear of the vehicle. The sensors may include, for example, a camera, a laser sensor, and/or a radar sensor. The sensors may identify objects and determine an angle and distance between the vehicle and the objects. The sensors may also identify lane markings on the road to determine in which lanes the objects are located. If an object is in the same lane as the vehicle and the distance between the object and the vehicle is decreasing, there may be a collision risk.

SUMMARY

A system for a vehicle operating on a road including a vehicle placement module references, based on a geographic position of the vehicle, a road mapping database to identify a selected lane of the road where the vehicle is located. A lane assignment module (i) receives information indicating identification of an object in the road and (ii) determines a relative lane of the object with respect to the selected lane. A curvature plotting module determines a curvature line of the selected lane. An object placement module (i) determines a first distance value representing a shortest distance between the object and the curvature line and (ii) determines whether the relative lane of the object is the selected lane based on the first distance value and a lane width value. An alert generation module selectively generates an alert signal in response to the object being in the selected lane.

In other features, the lane assignment module further includes a width determination module configured to calculate the lane width value of the selected lane at a point on the curvature line closest to the object. In other features, the width determination module is configured to calculate: (i) a second distance value representing a distance between the geographic position of the vehicle and the point on the curvature line closest to the object and (ii) the lane width value based on the second distance value.

In other features, the width determination module is configured to calculate the lane width value according to at least one of a first equation and a second equation. The first equation is $$W = \left(\frac{|x_o - x_v| \times g_{dist}}{k_{dist}}\right) \times g_{curve},$$

and the second equation is $$W = \left(\frac{d_{fixed} \times g_{dist}}{k_{dist}}\right) \times g_{curve},$$

where W is the lane width value, $x_v$ is a location of the vehicle along an x-axis and the x-axis is tangential to the curvature line at a point on the curvature line closest to the vehicle, $x_o$ is a location of the object along the x-axis, $d_{fixed}$ is a predetermined distance, $g_{dist}$ is a distance gain value, $g_{curve}$ is a curve gain value, and $k_{dist}$ is a distance coefficient value. In other features, $d_{fixed}$, $g_{dist}$, and $k_{dist}$ are predetermined constants and $g_{curve}$ is determined based on the second distance value. In other features, the width determination module is configured to calculate the lane width value according to the first equation when the second distance value is less than a first threshold distance and the second equation when the second distance value is greater than a second threshold distance.

In other features, the vehicle placement module is configured to identify the selected lane of the road by referencing the road mapping database to determine a lane width of the road. The vehicle placement module then calculates a vehicle offset distance representing a shortest distance between the geographic position of the vehicle and the curvature line. The vehicle placement module further determines the selected lane based on the vehicle offset distance and the lane width of the road. The vehicle placement module determines the vehicle is in the selected lane in response to the vehicle offset distance being less than the lane width of the road.

In other features, the object placement module is configured to determine the object is in the selected lane in response to the first distance value being less than half of the lane width value. In other features, the object placement module is configured to determine the object is in an adjacent lane in response to the first distance value being greater than half of the lane width value and less than 1.5 times the lane width value. In other features, the system includes an object location module configured to identify the object in the road and determine (i) an object location and (ii) an object velocity. The alert generation module is configured to generate the alert signal in response to (i) the object being in the selected lane and (ii) a closing speed of the vehicle and the object exceeding a closing speed threshold.

In other features, the object location module is configured to receive data from at least one of (i) a camera, (ii) a laser, and (iii) a radar. The data includes the object location and the object velocity. In other features, the alert generation module is configured to send the alert signal to at least one of a brake actuator module, a steering actuator module, a haptic actuator module, and a driver warning device. The brake actuator module is configured to actuate brakes of the vehicle to slow the vehicle in response to the alert signal. The steering actuator module is configured to change a trajectory of the vehicle to move the vehicle into an adjacent lane in response to the alert signal. The haptic actuator module is configured to actuate a vibrator sensor attached to a steering wheel of the vehicle in response to the alert signal. The driver warning device is configured to alert a driver of the vehicle to a collision risk in response to the alert signal.

In other features, the alert generation module is configured to send the alert signal to the brake actuator module in response to the vehicle being in the selected lane and the vehicle being within a first distance of the object. In other features, the alert generation module is configured to send the alert signal to the steering actuator module in response to the vehicle being in the selected lane and the vehicle being within a second distance of the object. In other features, the alert generation module is configured to send the alert signal to the haptic actuator module in response to the vehicle being in the selected lane and the vehicle being within a third distance of the object. In other features, the alert generation module is configured to send the alert signal to the driver warning device in response to the vehicle being in the selected lane and the vehicle being within a fourth distance of the object. The first distance is less than the second distance, the second distance is less than the third distance, and the third distance is less than the fourth distance. In other features, the method includes a global navigation satellite system (GNSS) configured to determine the geographic position of the vehicle.

A method for a vehicle operating on a road includes referencing a road mapping database based on a geographic position of the vehicle to identify a selected lane of the road. The vehicle is located within the selected lane. The method further includes receiving information indicating identification of an object in the road. The method also includes determining a curvature line of the selected lane based on the road mapping database. The method includes determining a first distance value representing a shortest distance between the object and the curvature line. The method further includes determining whether a relative lane of the object is the selected lane based on the first distance value and a lane width value. The method also includes selectively generating an alert signal in response to the object being in the selected lane.

In other features, the method includes calculating the lane width value of the selected lane at a point on the curvature line closest to the object by calculating a second distance value representing a distance between the geographic position of the vehicle and the point on the curvature line closest to the object and calculating the lane width value based on the second distance value. In other features, the lane width value is calculated according to a first equation when the second distance value is less than a first threshold distance and a second equation when the second distance value is greater than a second threshold distance. The first equation is $$W = \left(\frac{|x_o - x_v| \times g_{dist}}{k_{dist}}\right) \times g_{curve}$$

and the second equation is $$W = \left(\frac{d_{fixed} \times g_{dist}}{k_{dist}}\right) \times g_{curve},$$

where W is the lane width value, $x_v$ is a location of the vehicle along an x-axis and the x-axis is tangential to the curvature line at a point on the curvature line closest to the vehicle, $x_o$ is a location of the object along the x-axis, $d_{fixed}$ is a predetermined distance, $g_{dist}$ is a predetermined distance gain value, and $g_{curve}$ is a curve gain value determined based on the second distance value.

In other features, the method includes determining the object is in the selected lane in response to the first distance value being less than half of the lane width value. In other features, the method includes determining the object is in an adjacent lane in response to the first distance value being greater than half of the lane width value and less than 1.5 times the lane width value. In other features, the method includes identifying the object in the road. The method also includes determining (i) an object location and (ii) an object velocity. The method further includes generating the alert signal in response to (i) the object being in the selected lane and (ii) a closing speed of the vehicle and the object exceeding a closing speed threshold.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
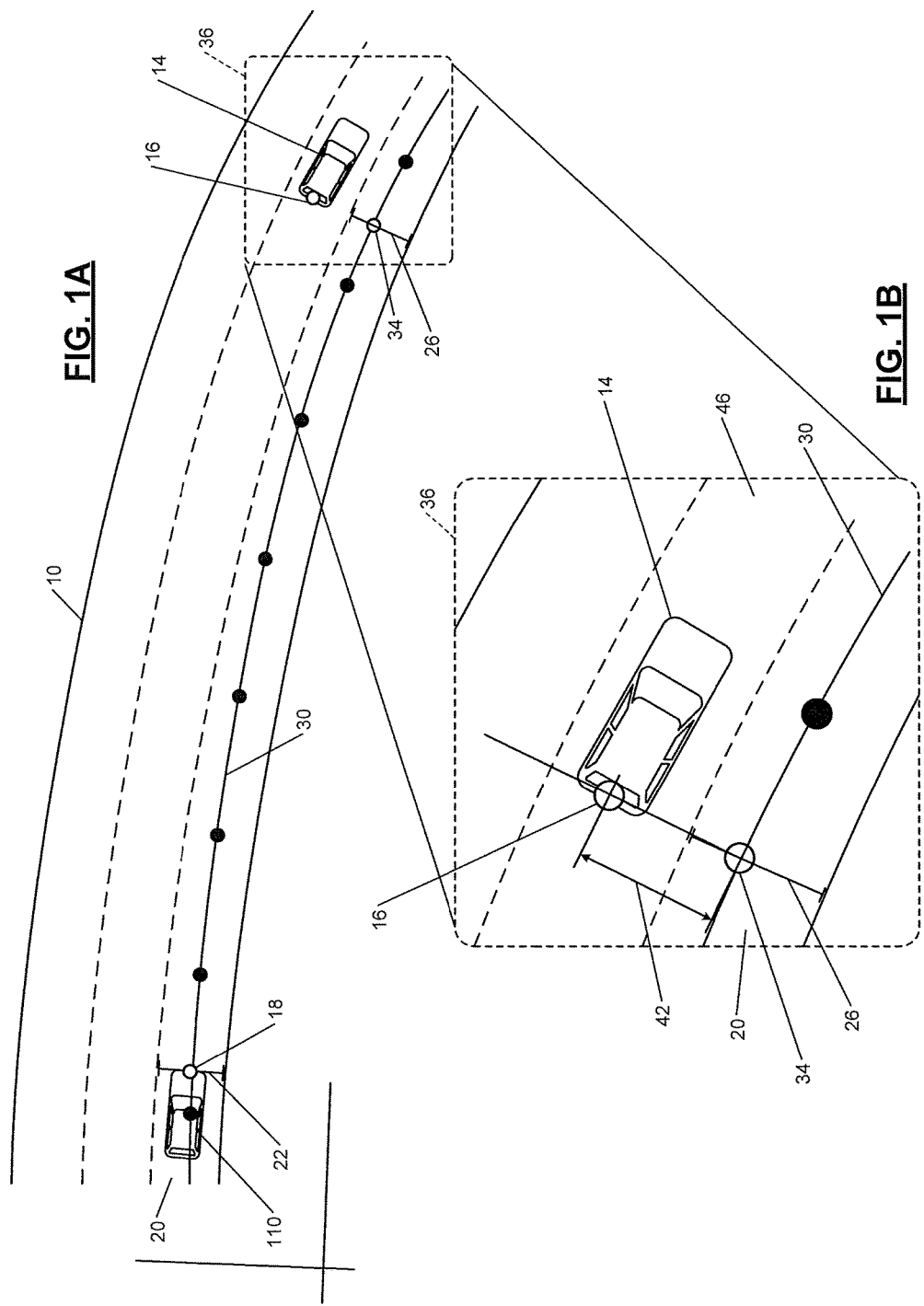
FIG. 1A is a plan view of a vehicle and an object on a curved road.
FIG. 1B is an expanded plan view of the object of FIG. 1A.

In autonomous vehicles and vehicle safety systems, sensors are used to automatically identify objects from the perspective of the vehicle. For example, when the vehicle is operating on a road, a safety system of the vehicle may identify objects in front of, as well as behind, the vehicle on the road. Note that, while operating usually means moving, the vehicle may be stationary due to traffic, mechanical breakdown, running out of gas, etc. Based on the closing speed (the rate at which the distance between the vehicle and an object decreases), a collision risk may be present between the vehicle and the object. For a given closing speed, the collision risk increases as the distance between the vehicle and the object decreases. However, if the object and the vehicle are in different lanes, the collision risk may be less.

The vehicle safety system may respond to the collision risk with passive measures, such as warning the driver of the vehicle and warning the object, or active measures, such as braking or changing lanes. If the object is behind the vehicle, the active measure may include accelerating. While objects behind the vehicle are encompassed by the present disclosure, for simplicity the discussion below will focus on objects in front of the vehicle.

The safety system may take action more quickly if the object is in the same lane as the vehicle than if the object is in an adjacent lane, and may take action more quickly if the object is in the adjacent lane than if the object is in a further lane. However, determining whether the object is in the same lane as the vehicle increases in difficulty with the distance between the vehicle and the object due to, for example, measurement inaccuracies and the decreasing ability to identify lane markings at distance. The problem is made substantially harder if there is any road curvature.

The present disclosure describes systems and methods of determining the relative lane of an object (with respect to the vehicle) that work at much greater distances than traditional systems and methods. A vehicle safety system according to the present disclosure can consult a road mapping database that includes geographical data for roads that is accurate enough to determine the curvature of the road at any particular location. This database may encompass public roads across an entire country, globe, or some subset. In various implementations, the vehicle safety system may only store portions of the database relevant to a geographical area in which the vehicle is located.

The road mapping database may store geographical data for the overall road, though some data may be specific to different sides of a divided road. Some data may even be specific to each lane. For example, the road mapping database may include a series of points that define each lane. The road mapping database may also include data about the width of the lanes. In the below example, assume that the vehicle is operating on a road for which the road mapping database includes data for each lane of the road in each direction.

The vehicle safety system determines a geographic position of the vehicle, such as based on a global positioning system (GPS), and consults the road mapping database to determine which lane the vehicle is located in. From the road mapping database, the vehicle safety system determines a curvature line of the vehicle's lane from where the vehicle is located to where an identified object is located. In various implementations, the vehicle safety system may plot a curvature line for each lane of the road and calculate the vehicle's distance to each curvature line. The smallest of the distances determines the vehicle's lane.

The vehicle safety system calculates a location of the identified object based on the distance to the object and an angle of the object with respect to the vehicle. The shortest distance between the object and the curvature line of the vehicle's lane is referred to as an offset distance. If the offset distance is less than half the lane width, the object is considered to be in the same lane as the vehicle.

Because the accuracy of the object's position decreases as distance increases, the vehicle safety system estimates the lane width such that it increases with distance. Because greater lane curvature increases measurement uncertainty, the estimated lane width may also increase with increased lane curvature. A visual example is now described.

In FIG. 1A, a plan view of a vehicle 110 and an object 14 on a curved road 10 is shown. The vehicle 110 includes one or more sensors to identify objects in the curved road 10 in front of the vehicle 110. For example, the sensors may include a laser sensor, a radar sensor, or a camera.

Once the DCM 130 identifies the object 14 (for example, another vehicle), a driving control module (DCM) 130 (shown in FIG. 3) of the vehicle 110 determines a distance between the vehicle 110 and the object 14.

Figure 2:
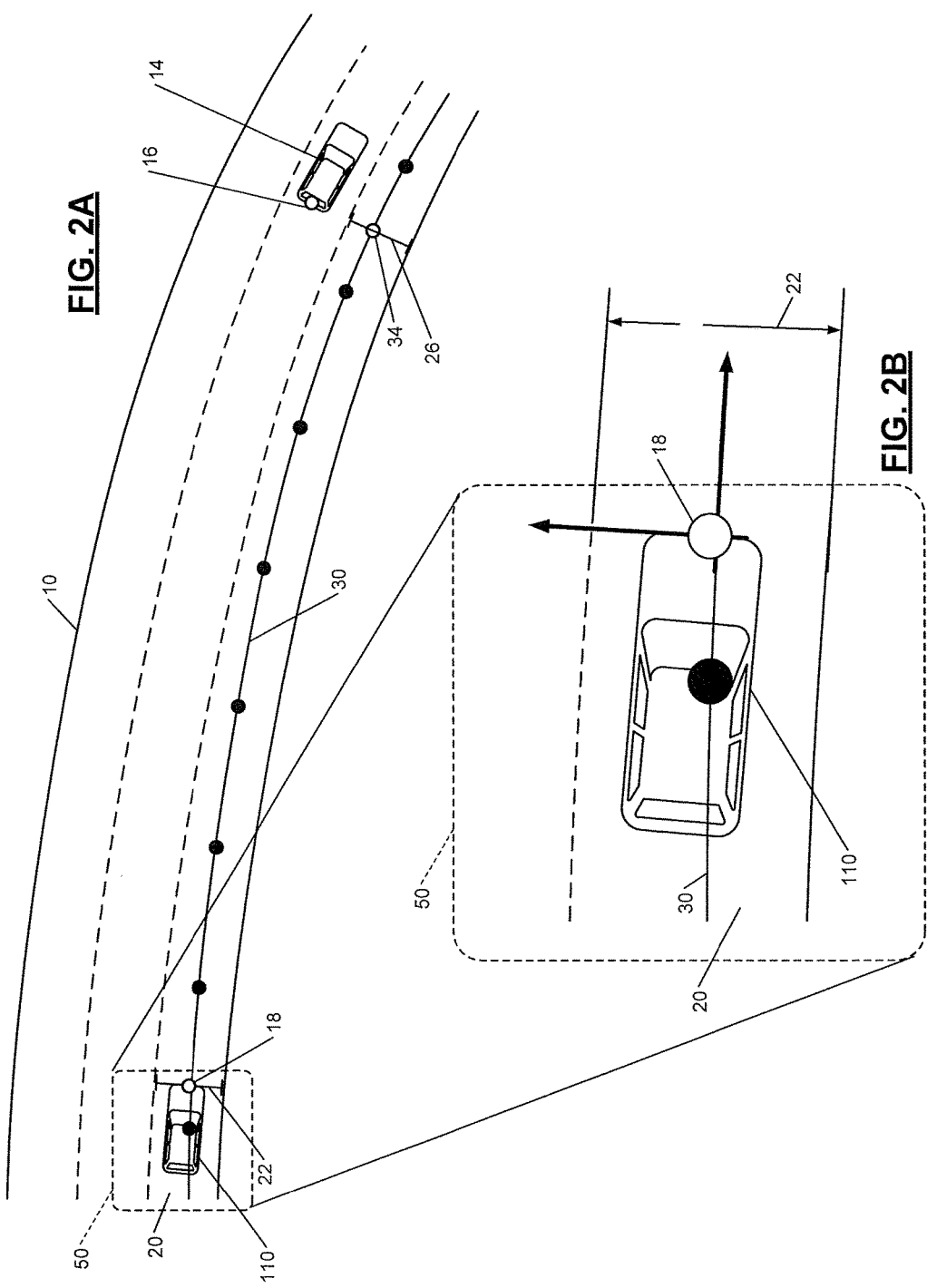
FIG. 2A is a copy of the plan view of FIG. 1A.
FIG. 2B is an expanded plan view of the vehicle of FIG. 2A.

For example, the DCM 130 can represent an object location 16 and a vehicle location 18 on a coordinate system, such as a Cartesian coordinate system as shown in FIGS. 1A and 2B with an x-axis and a y-axis. The x-axis is tangential to a curvature line of a lane 20 of the vehicle at the vehicle location 18 and the y-axis is perpendicular to the x-axis. The vehicle location 18 is specified by an x-axis location ($x_v$) and a y-axis location ($y_v$). The object location 16 is specified by an x-axis location ($x_o$) and a y-axis location ($y_o$). The sensor can determine the object location 16, ($x_o$, $y_o$) with respect to the vehicle 110. For example, the sensor can select the object location 16 as the middle of the object 14 closest to the vehicle 110 or any other visible region on the object 14. In this case the middle of a rear portion of the object 14 is the object location 16.

As shown in FIGS. 1A, and 2A-2B, the vehicle location 18 can represent a particular reference point of the vehicle 110. For example, a center of a front bumper of the vehicle 110 may be used as the vehicle location 18. Additionally, the DCM 130 can receive the location of a specific point of the vehicle 110 (for example, by receiving a geographical position of the vehicle 110) and compensate for the known, predetermined distance between the received geographical location of the vehicle 110 and the center front bumper of the vehicle to determine the vehicle location 18.

The DCM 130 includes a global positioning system (GPS) module 131 (shown in FIG. 3) and a map database. In other embodiments, the DCM 130 may instead use a positioning module based on another global navigation satellite system (GNSS) to determine the vehicle location 18.

The GPS module 131 generates signals identifying the geographical position of the vehicle 110 and sends the signals to the DCM 130. The GPS module 131 determines the geographical position of the vehicle 110 where the GPS module 131 is located in the vehicle 110. The DCM 130 or the GPS module 131 can compensate for the difference between the geographical position determined by the GPS module 131 and the reference point of the vehicle 110 to determine the vehicle location 18.

The DCM 130 uses the vehicle location 18 to determine the lane 20 of the vehicle 110. The DCM 130 references the map database to determine a lane width 22 of the lane 20 of the vehicle 110 at the vehicle location 18. The map database stores information such as lane width 22 and lane curvature information. The map database may also store information for each lane line of the curved road 10. For example, the map database may store a series of points for each lane line along the curved road 10 shown in FIGS. 1A-2B. As mentioned above, the map database can store data for public roads across an entire country, globe, or some subset.

Once the DCM 130 receives the vehicle location 18 from the GPS module 131, the DCM 130 determines the lane 20 of the vehicle 110 based on data stored in the map database. To determine which lane the vehicle 110 is in, the DCM 130 compares the vehicle location 18 to the series of points in the map database representing each lane line. The DCM 130 determines that the vehicle 110 is in the lane 20 where the vehicle location 18 falls between two sets of lane lines.

In some scenarios, the vehicle location 18 may coincide with one of the lane lines, placing the vehicle 110 on one of the lane lines and between two of the lanes. In that case, the DCM 130 may assume the vehicle 110 is in the innermost lane, the outermost lane, conduct further calculations to determine the lane of the vehicle 110, etc. In some implementations, as described more fully below, the DCM 130 can plot a curvature line along a center of each lane (based on a series of points in the map database representing the curvature line for each lane), and identify the closest curvature line to the vehicle 110.

Once the lane 20 of the vehicle 110 is determined, a relative lane assignment of the object 14 is calculated. To calculate the relative lane assignment of the object 14, the DCM 130 calculates an estimated lane width 26 of the lane 20 at the distance of the object 14. That is, the DCM 130 calculates the estimated lane width 26 near the object location 16. The estimated lane width 26 is calculated at the object location 16 to compensate for curvature in the curved road 10. To calculate the estimated lane width 26, the DCM 130 plots a curvature line 30 along a center of the lane 20. The DCM 130 fits the curvature line 30 to the center of the lane 20 based on the series of points of the center of each lane stored in the map database. The map database also includes lane width data at each point along each lane.

Alternatively, the map database can store a series of points along the center of one lane for each road instead of for each lane of each road. Then, based on the series of points for each lane line and lane widths, the DCM 130 can calculate the distances to the additional lane from the curvature line of one lane. After the curvature line 30 is plotted, the DCM 130 locates a point 34 ($x_p$, $y_p$) on the curvature line 30 closest to the object location 16.

In FIG. 1B, an expanded plan view 36 of the object 14 of FIG. 1A is shown. To calculate the estimated lane width 26 of the lane 20 at the object location 16, the DCM 130 determines the distance along the curvature line 30 between the vehicle location 18 and the point 34. Additionally, the DCM 130 calculates an offset distance 42 between the point 34 and the object location 16. The offset distance 42 represents the shortest distance between the object location 16 and the curvature line 30. The offset distance 42 can be calculated based on the difference between the point 34 and the object location 16 along the x-axis ($|x_p-x_o|$) and along the y-axis ($|y_p-y_o|$). Specifically, using the Pythagorean theorem: the offset distance $42=\sqrt{(|x_p-x_o|)^2+(|y_p|y_o|)^2}$.

When the distance along the curvature line 30 between the vehicle location 18 and the point 34 is less than a first threshold distance, equation 1 is used to calculate the estimated lane width 26:

$$W = \left(\frac{|x_v - x_o| \times g_{dist}}{k_{dist}}\right) \times g_{curve}, \quad (1)$$

where $|x_v-x_o|$ is a distance between the vehicle location 18 and the object location 16 along the x-axis, $g_{dist}$ is a distance gain value, $k_{dist}$ is a distance coefficient value, and a $g_{curve}$ is a curve gain, which is a measure of curvature at a distance. The first threshold distance can be between 80 and 90 meters. The curve gain may be determined experimentally. The following lookup table 1 lists some of the curve gain values as determined experimentally and may be used in-vehicle to determine the curve gain:

| $|y_v - y_p|$ (meters) | 0 | 1 | 2 | 3 | 30 | 40 |
|---|---|---|---|---|---|---|
| $g_{curve}$ | .9 | .5 | .3 | .2 | .1 | .01 |

As shown in table 1, the curve gain decreases as the distance along the y-axis between the vehicle location 18 and the point 34 increases. The distance gain value and the distance coefficient value are predetermined values. The distance gain value is typically around 1.5. The distance coefficient is typically around 100.

When the point 34 is farther than a second threshold distance from the vehicle location 18, equation 2 is used to calculate the estimated lane width 26:

$$W = \left(\frac{d_{fixed} \times g_{dist}}{k_{dist}}\right) \times g_{curve}, \quad (2)$$

where $d_{fixed}$ is the second threshold distance, $g_{dist}$ is a distance gain value, $k_{dist}$ is a distance coefficient value, and $g_{curve}$ is a curve gain. The second threshold distance may be, for example, between 120 and 150 meters. Using the fixed second threshold distance in equation 2 prevents the estimated lane width 26 from increasing based on the distance between the point 34 and the vehicle location 18 because the second threshold distance is a fixed value. However, equation 2 still alters the lane width 26 based on curvature of the road.

Generally, using equations 1 and 2, the estimated lane width 26 increases when the object location 16 is farther from the vehicle location 18. Increasing the estimated lane width 26 as distance increases compensates for limitations of sensors.

Once the estimated lane width 26 is calculated at the point 34, the DCM 130 can determine whether the object 14 is in the same lane as the vehicle 110. That is, if the offset distance 42 between the point 34 and the object location 16 is greater than half of the estimated lane width 26, then the object 14 is determined to not be in the same lane 20 as the vehicle 110. However, if the offset distance 42 is less than half of the estimated lane width 26, then the object 14 is determined to be in the same lane 20 as the vehicle 110.

Moreover, the DCM 130 can also determine a relative lane of the object 14 with respect to the vehicle 110. That is, if the object location 16 is greater than half the estimated lane width 26 from the point 34 but less than 1.5 times the estimated lane width 26 from the point, the object 14 is in an adjacent lane 46. As discussed with respect to the vehicle 110 coinciding with a lane line, if the object location 16 is on a lane line, the DCM 130 can select an innermost or an outermost lane, by default, as the relative lane. Alternatively, when the map database includes curvature lines for each lane, the DCM 130 can determine the curvature line closest to the object location 16.

Once the DCM 130 determines whether the object 14 is in the same lane 20 as the vehicle 110, the DCM 130 can alert the driver that the object 14 is in the same lane 20 as the vehicle 110. In some implementations, the DCM 130 can alert the driver when the object 14 is in the same lane 20 and the distance between the vehicle location 18 and the object location 16 is less than a predetermined distance, for example, 10 feet. In other implementations, the DCM 130 can alert the driver when the object 14 is in the same lane 20 and the closing speed indicates a collision risk between the object 14 and the vehicle 110. Alternatively, the vehicle 110 can perform remedial actions such as braking or changing a trajectory of the vehicle 110 into the adjacent lane 46.

In FIG. 2A, a copy of the plan view of FIG. 1A is shown. The same curved road 10 from FIG. 1A is shown with another expanded plan view 50 showing the vehicle 110.

In FIG. 2B, an expanded plan view 50 of the vehicle 110 of FIG. 2A is shown. As described above, the DCM 130 can normalize the vehicle location 18 to a particular location in the vehicle 110 at a known distance from the GPS module 131.

In some implementations, the DCM 130 can determine the lane 20 of the vehicle 110 based on a distance between the vehicle location 18 and the curvature line 30. Similar to determining the offset distance 42 between the point 34 and the object location 16, the distance between the vehicle location 18 and a point on the curvature line 30 closest to the vehicle location 18 can indicate the lane 20 of the vehicle 110. The DCM 130 can reference the map database to receive the lane width 22 at the vehicle location 18. Then, if the vehicle location 18 is over half the lane width 22 from the curvature line 30, the vehicle 110 is not in the lane 20 of the curvature line 30.

The DCM 130 can use the same method to determine if the vehicle 110 is in other lanes using distance information indicating the distance each lane is from the curvature line. The map database can contain curvature information for each road or for each lane on each road.

As shown in FIG. 2B, the x-axis is tangential to the curvature line of the lane 20 of the vehicle 110 at the vehicle location 18 and the y-axis is perpendicular to the x-axis. Therefore, the x-axis vehicle location ($x_v$) will be zero and the y-axis vehicle location ($y_v$) may be offset from the y-axis, having a positive or negative value.

Figure 3:
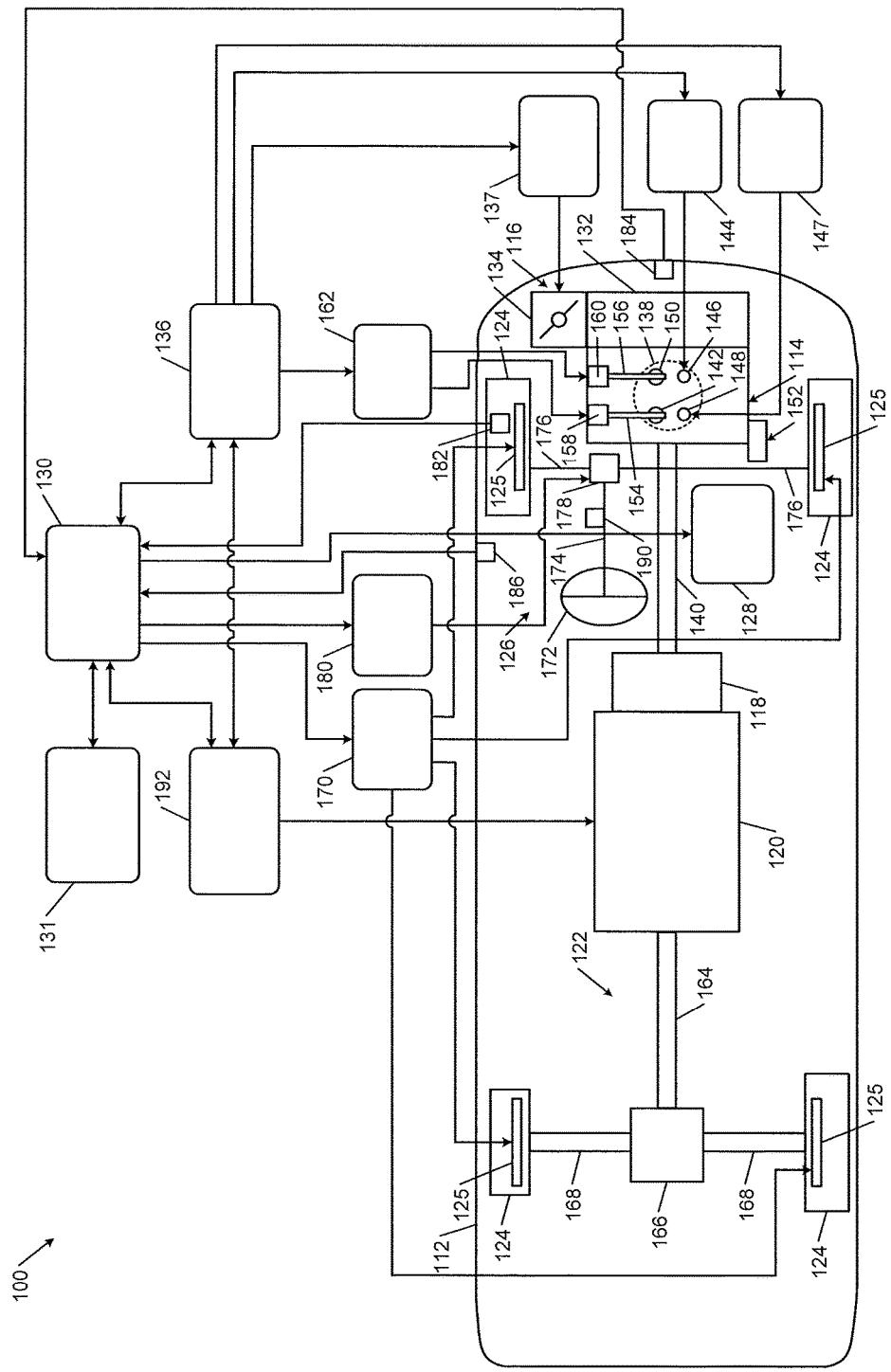
FIG. 3 is a functional block diagram of a driving control module (DCM) integrated with a vehicle.

In FIG. 3, a functional block diagram of the DCM 130 integrated with the vehicle 110 is shown. The vehicle 110 includes a vehicle body 112, an engine 114, an intake system 116, a torque converter 118, a transmission 120, a driveline 122, wheels 124, friction brakes 125, a steering system 126, and a driver warning device 128. The engine 114 combusts an air/fuel mixture to produce drive torque for the vehicle 110. The amount of drive torque produced by the engine 114 is based on a driver input.

The GPS module 131 generates GPS signals identifying the vehicle location 18. The GPS module 131 may be onboard or part of the vehicle 110 or the GPS module 131 may be remote from or separate from the vehicle 110. The GPS module 131 includes a receiver for communicating with a GPS satellite.

Air is drawn into the engine 114 through the intake system 116. The intake system 116 includes an intake manifold 132 and a throttle valve 134. The throttle valve 134 may include a butterfly valve having a rotatable blade. An engine control module (ECM) 136 controls a throttle actuator module 137, which regulates opening of the throttle valve 134 to control the amount of air drawn into the intake manifold 132.

Air from the intake manifold 132 is drawn into cylinders of the engine 114. While the engine 114 may include multiple cylinders, for illustration purposes a single representative cylinder 138 is shown. For example only, the engine 114 may include 2, 3, 4, 5, 6, 8, 10, and/or 12 cylinders. The ECM 136 may deactivate some of the cylinders, which may improve fuel economy under certain engine operating conditions.

The engine 114 may operate using a four-stroke cycle. The four strokes, described below, are named the intake stroke, the compression stroke, the combustion stroke, and the exhaust stroke. During each revolution of a crankshaft 140, two of the four strokes occur within the cylinder 138. Therefore, two crankshaft revolutions are necessary for the cylinder 138 to experience all four of the strokes.

During the intake stroke, air from the intake manifold 132 is drawn into the cylinder 138 through an intake valve 142. The ECM 136 controls a fuel actuator module 144, which regulates fuel injections performed by a fuel injector 146 to achieve a target air/fuel ratio. Fuel may be injected into the intake manifold 132 at a central location or at multiple locations, such as near the intake valve 142 of each of the cylinders. In various implementations, fuel may be injected directly into the cylinders or into mixing chambers associated with the cylinders. The fuel actuator module 144 may halt injection of fuel to cylinders that are deactivated.

The injected fuel mixes with air and creates an air/fuel mixture in the cylinder 138. During the compression stroke, a piston (not shown) within the cylinder 138 compresses the air/fuel mixture. The engine 114 may be a compression-ignition engine, in which case compression in the cylinder 138 ignites the air/fuel mixture. Alternatively, the engine 114 may be a spark-ignition engine, in which case a spark actuator module 147 energizes a spark plug 148 to generate a spark in the cylinder 138 based on a signal from the ECM 136, which ignites the air/fuel mixture. The timing of the spark may be specified relative to the time when the piston is at its topmost position, referred to as top dead center (TDC).

The spark actuator module 147 may be controlled by a spark timing signal specifying how far before or after TDC to generate the spark. Because piston position is directly related to crankshaft rotation, operation of the spark actuator module 147 may be synchronized with crankshaft angle. In various implementations, the spark actuator module 147 may halt provision of spark to deactivated cylinders.

Generating the spark may be referred to as a firing event. The spark actuator module 147 may have the ability to vary the timing of the spark for each firing event. The spark actuator module 147 may even be capable of varying the spark timing for a next firing event when the spark timing signal is changed between a last firing event and the next firing event. In various implementations, the engine 114 may include multiple cylinders and the spark actuator module 147 may vary the spark timing relative to TDC by the same amount for all cylinders in the engine 114.

During the combustion stroke, combustion of the air/fuel mixture drives the piston down, thereby driving the crankshaft 140. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 150. The byproducts of combustion are exhausted from the vehicle via an exhaust system 152.

The intake valve 142 may be controlled by an intake camshaft 154, while the exhaust valve 150 may be controlled by an exhaust camshaft 156. In various implementations, multiple intake camshafts (including the intake camshaft 154) may control multiple intake valves (including the intake valve 142) for the cylinder 138 and/or may control the intake valves (including the intake valve 142) of multiple banks of cylinders (including the cylinder 138). Similarly, multiple exhaust camshafts (including the exhaust camshaft 156) may control multiple exhaust valves for the cylinder 138 and/or may control exhaust valves (including the exhaust valve 150) for multiple banks of cylinders (including the cylinder 138).

The time at which the intake valve 142 is opened may be varied with respect to piston TDC by an intake cam phaser 158. The time at which the exhaust valve 150 is opened may be varied with respect to piston TDC by an exhaust cam phaser 160. A valve actuator module 162 may control the intake and exhaust cam phasers 158, 160 based on signals from the ECM 136. When implemented, variable valve lift may also be controlled by the valve actuator module 162.

The valve actuator module 162 may deactivate the cylinder 138 by disabling opening of the intake valve 142 and/or the exhaust valve 150. The valve actuator module 162 may disable opening of the intake valve 142 by decoupling the intake valve 142 from the intake cam phaser 158. Similarly, the valve actuator module 162 may disable opening of the exhaust valve 150 by decoupling the exhaust valve 150 from the exhaust cam phaser 160. In various implementations, the valve actuator module 162 may control the intake valve 142 and/or the exhaust valve 150 using devices other than camshafts, such as electromagnetic or electrohydraulic actuators.

The ECM 136 adjusts the position of the throttle valve 134, the amount and/or timing of fuel injections performed by the fuel injector 146, the timing at which spark is generated by the spark plug 148, and/or the timing at which the intake and exhaust valves 142 and 150 are opened to achieve a target torque output of the engine 114. The ECM 136 determines the target engine torque based on the driver input.

Torque output at the crankshaft 140 is transferred through the torque converter 118, through the transmission 120, through the driveline 122, and to the wheels 124. The driveline 122 includes a drive shaft 164, a differential 166, and axle shafts 168. The torque converter 118, the transmission 120, and the differential 166 amplify engine torque by several gear ratios to provide axle torque at the axle shafts 168. The axle torque rotates the wheels 124, which causes the vehicle 110 to accelerate in a forward or rearward direction.

The friction brakes 125 are mounted to the wheels 124. The friction brakes 125 resist (slow) rotation of the wheels 124 when applied. The friction brakes 125 may include drum brakes and/or disc brakes, and may include electrohydraulic actuators and/or electromechanical actuators that press a brake pad against a brake disc and/or drum when the friction brakes 125 are applied. A brake actuator module 170 applies the friction brakes 125 based on a brake pedal position and/or a signal from the DCM 130. The friction brakes 125 may be independently applied at different levels.

The steering system 126 selectively turns the front wheels 124, thereby turning the vehicle 110. The steering system 126 includes a steering wheel 172, a steering column 174, one or more steering linkages 176, and a steering actuator 178. A driver may rotate the steering wheel 172 to turn the vehicle 110 left or right or to input a request to turn the vehicle 110 left or right. The steering column 174 is coupled to the steering wheel 172 so that the steering column 174 rotates when the steering wheel 172 is rotated. The steering column 174 may also be coupled to the steering linkages 176 so that rotation of the steering column 174 causes translation of the steering linkages 176. The steering linkages 176 are coupled to the front wheels 124 so that translation of the steering linkages 176 turns the wheels 124.

The steering actuator 178 is coupled to the steering linkages 176 and translates the steering linkages 176, thereby turning the front wheels 124. In various implementations, the steering actuator 178 may be an electrohydraulic and/or electromechanical actuator. In implementations where the steering column 174 is coupled to the steering linkages 176, such as power steering systems, the steering actuator 178 may reduce the amount of effort that the driver must exert to turn the vehicle 110 left or right. In various implementations, the steering column 174 may not be coupled to the steering linkages 176, and the steering actuator 178 alone may translate the steering linkages 176. Steering systems where the steering column 174 is not coupled to the steering linkages 176 may be referred to as a steer-by-wire system.

A steering actuator module 180 adjusts actuation of the steering actuator 178 based on a signal from the DCM 130. The DCM 130 may control the steering actuator 178 based on the angular position of the steering wheel 172. Alternatively, the DCM 130 may control the steering actuator 178 autonomously (for example, independent of the angular position of the steering wheel 172).

One or more wheel speed sensors 182 are mounted to one or more of the wheels 124 and measures the speed of wheels 124, respectively. For example, one wheel speed sensor may be provided for each wheel and measure that wheels wheel speed.

The vehicle 110 may include a plurality of sensors, such as a camera 184, to detect objects. The camera 184 is mounted to the vehicle 110 to capture images in front of the vehicle body 112 or to the side of the vehicle body 112. The camera 184 generates an image of the environment in front or to the side of the vehicle 110. The camera 184 may be located, for example, in a front fascia of the vehicle 110, as exemplified in FIG. 3. The camera 184, however, may be located elsewhere, such as within a rear view mirror inside of a front wind shield of the vehicle 110 or at another suitable location to capture images in front of the vehicle 110.

The vehicle 110 can also include a laser 186 on the side of the vehicle 110. The laser 186 may be included in addition to or instead of the camera 184. Both the camera 184 and the laser 186 detect objects in front of the vehicle 110. Furthermore, both the camera 184 and the laser 186 calculate a distance between the object 14 and the vehicle 110 as well as an object speed. Alternatively, the vehicle 110 can include radar to identify objects and calculate the object location 16 as well as the object speed.

A steering wheel angle sensor 190 measures the angular position of the steering wheel 172 relative to a predetermined position. The predetermined position may correspond to a location where the vehicle should (or does) travel straight along a longitudinal axis of the vehicle. The steering wheel angle sensor 190 may be mounted to the steering column 174 and may include, for example, a Hall Effect sensor that measures the angular position of a shaft that is disposed within the steering column 174 and rotatably coupled to the steering wheel 172.

A transmission control module (TCM) 192 shifts gears of the transmission 120 based on operating conditions of the vehicle 110 and a predetermined shift schedule. The operating conditions may include the vehicle speed, a target acceleration of the vehicle 110, and/or a target torque output of the engine 114. The TCM 192 may determine a vehicle speed based on wheel speeds measured using the wheel speed sensors 182. For example, the TCM 192 may determine the vehicle speed based on an average of the wheel speeds or an average of speeds of undriven or non-driven wheels of the vehicle. The TCM 192 may receive the target vehicle acceleration and/or the target engine torque from the DCM 130 and/or the ECM 136. The ECM 136 may communicate with the TCM 192 to coordinate shifting gears in the transmission 120. For example, the ECM 136 may reduce engine torque during a gear shift.

The DCM 130 may activate the driver warning device 128 to notify the driver that one or more objects are travelling in the same lane 20 as the vehicle 110. The driver warning device 128 may include an electronic display (for example, a touchscreen display) that is within the view of the driver and is operable to display lights, text, and/or images. Additionally or alternatively, the driver warning device 128 may include a heads-up display (HUD) that, for example, projects light, text, and/or images onto a windshield (not shown) of the vehicle 110. Additionally or alternatively, the driver warning device 128 may include one or more vibrators mounted to, for example, the steering wheel 172 and/or the driver's seat (not shown) to provide haptic feedback to the driver. Additionally or alternatively, the driver warning device 128 may include a speaker that is operable to generate a sound or audible message within the vehicle 110.

The DCM 130 may send an alert signal to the brake actuator module 170 in response to the object 14 being within a first distance (for example, 5 feet) of the vehicle 110. For example, if the DCM 130 determines that the object 14 is in the same lane 20 as the vehicle 110 and within a first distance of the vehicle 110, the DCM 130 can send the alert signal directing the brake actuator module 170 to actuate the friction brakes 125 of the vehicle 110.

The DCM 130 may send the alert signal to the steering actuator module 180 to adjust the trajectory of the vehicle 110 in response to the object 14 being within a second distance (for example, 10 feet) of the vehicle 110. For example, if the DCM 130 determines that the object 14 is in the same lane 20 as the vehicle 110 and is within the second distance of the vehicle 110, the DCM 130 sends the alert signal directing the steering actuator module 180 to adjust the trajectory of the vehicle 110 to place the vehicle 110 in the adjacent lane 46.

Figure 4:
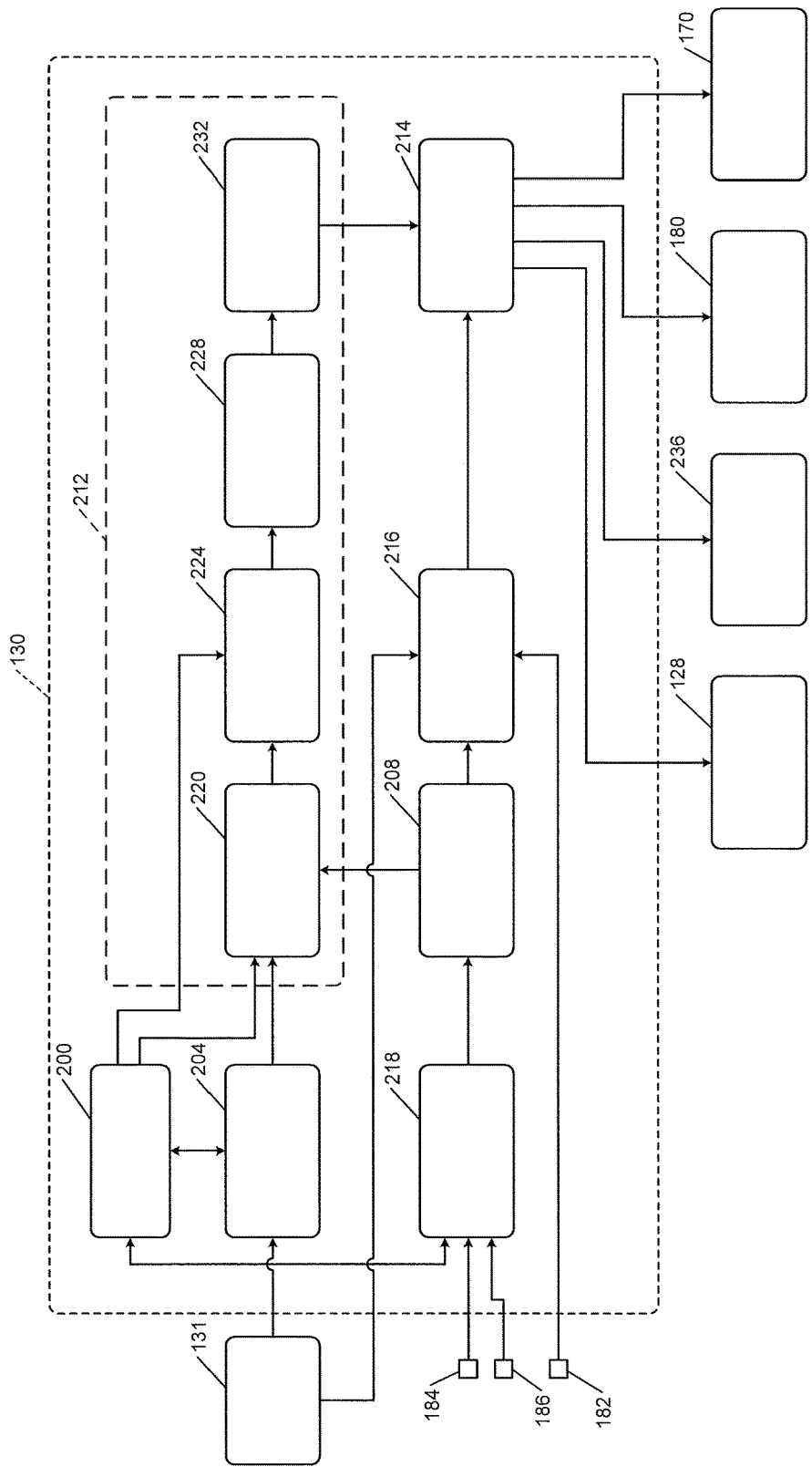
FIG. 4 is a functional block diagram of an example implementation of a DCM.

In FIG. 4, a functional block diagram of an example implementation of the DCM 130 is shown. The DCM 130 includes a map database 200, a vehicle placement module 204, an object location module 208, a lane assignment module 212, an alert generation module 214, a relative speed module 216, and, optionally, a sensor fusion module 218. The map database 200 includes information may encompass public roads across an entire country including lane line data, lane width data, and curvature line data for each lane. That is, the map database 200 includes lane width data for each lane of a road at each point along the road. In some implementations, a curvature line may be constructed based on lane line data and lane width data. Independent curvature line data may be included in the map database 200. In some implementations, the map database 200 may access or download information from a remote server.

In some implementations, the vehicle 110 can add to the map database 200 based on data recorded and stored by the camera 184. For example, the camera 184 can record data points such as lane markers on a lane to determine lane lines, lane width data, and construct curvature line data for a particular road.

The vehicle placement module 204 receives the vehicle location 18 from the GPS module 131. The vehicle placement module 204 references the map database 200 and determines the lane width 22 of the lane 20 based on the vehicle location 18. Optionally, the sensor fusion module 218 receives data from the camera 184, the laser 186, and/or the map database 200. In some implementations, the sensor fusion module 218 also receives data from a radar system. Alternatively, the camera 184, the laser 186, and/or the map database 200 send data directly to the object location module 208.

The sensor fusion module 218 determines whether the camera 184 and/or the laser 186 are identifying objects 14 in front of the vehicle 110 and providing data regarding those objects 14. Additionally, the sensor fusion module 218 may combine data received from the camera 184 and/or the laser 186 with the map database 200. Further, if the sensor fusion module 218 is receiving noisy or inconsistent data from, for example, the camera 184, the sensor fusion module 218 can select data collected from the laser 186 instead of the camera 184. Depending on the sensors, the sensor fusion module 218 may only be able to identify objects within a certain distance. For example, the camera 184 may only identify objects within a 200 meter distance.

The object location module 208 receives data regarding any object 14 in front of the vehicle 110. If the object 14 is identified, the object location module 208 determines the object location 16 based on data received from one of the sensors, for example, the camera 184.

The lane assignment module 212 includes a distance determination module 220, a curvature plotting module 224, a width determination module 228, and an object placement module 232. The distance determination module 220 receives the object location 16, the vehicle location 18, and data from the map database 200. Based on the object location 16 and the vehicle location 18, the distance determination module 220 calculates a distance between the vehicle location 18 and the object location 16.

The curvature plotting module 224 receives (i) the distance between the vehicle location 18 and the object location 16 from the distance determination module 220 and (ii) lane curvature information from the map database 200. The curvature plotting module 224 receives the lane width 22 of the lane 20 of the vehicle 110 from the vehicle placement module 204. The lane width 22 is based on the vehicle location 18. The curvature plotting module 224 plots the curvature line 30 along the center of the lane 20. The map database 200 includes a series of data points for each curvature line for each lane. In some implementations, the curvature line may be calculated based on lane width data and lane line data in the map database 200.

The width determination module 228 receives the object location 16, vehicle location 18, and the curvature line 30. The width determination module 228 identifies the point 34 on the curvature line 30 that is closest to the object location 16.

The width determination module 228 then calculates a distance along the curvature line 30 between the vehicle location 18 and the point 34 to determine the estimated lane width 26 at the point 34. As discussed with respect to FIGS. 1A and 1B, the width determination module 228 may use multiple equations to calculate the estimated lane width 26 at the point 34. For example, if the distance along the curvature line 30 between the vehicle location 18 and the point 34 is less than the first threshold distance, the estimated lane width 26 is calculated using equation 1. Alternatively, when the distance is exceeds the second threshold distance, equation 2 is used to calculate the estimated lane width 26.

In some implementations, both equations can calculate the estimated lane width 26 and the width determination module 228 can select the larger of the two calculated adjusted lane widths. Using the larger adjusted lane width prevents the lane assignment module 212 from mistakenly determining that the object 14 is not in the same lane 20 as the vehicle 110. To compensate for lane curvature and farther distances, the estimated lane width 26 is larger at farther distances. That is, generally, the farther away the object 14 is from the vehicle 110, the larger the estimated lane width 26 is to account for discrepancies in visual data. Therefore, calculating the estimated lane width 26 using both equations 1 and 2 and selecting the larger adjusted lane width between the two calculations as the estimated lane width 26 increases the likelihood the object 14 will be perceived as in the same lane 20 as the vehicle 110, reducing the likelihood that the driver will not be notified of the object 14. In alternative implementations, the width determination module 228 can select the smaller of the two adjusted lane widths.

Once the estimated lane width 26 is calculated, the object placement module 232 determines whether the object 14 is in the same lane 20 as the vehicle 110. The object placement module 232 compares the estimated lane width 26 with the offset distance 42 between the object location 16 and the point 34. Since the estimated lane width 26 represents the entire width of the lane 20, approximately half of the estimated lane width 26 represents the distance from the curvature line 30 (where the curvature line 30 is plotted along the center of the lane 20) to one of the lane lines. The object placement module 232 determines whether the object 14 is in the same lane 20 as the vehicle 110 by determining whether the offset distance 42 is less than half of the estimated lane width 26. That is, if the offset distance 42 is less than half of the estimated lane width 26, the object 14 is in the same lane 20 as the vehicle 110. However, if the offset distance 42 is greater than half of the estimated lane width 26, the object 14 is not in the same lane 20 as the vehicle 110.

In some implementations, the width determination module 228 can determine whether the object 14 is in the adjacent lane 46. As shown in FIG. 1B, the adjacent lane 46 is a single lane, however the adjacent lane 46 can be on either side of the lane 20. For example, if the object 14 is not in the same lane 20 as the vehicle 110, the object placement module 232 can compare the offset distance 42 to 1.5 times the estimated lane width 26. That is, if the object 14 is in the adjacent lane 46, the offset distance 42 between the object location 16 and the point 34 would be no greater than 1.5 times the estimated lane width 26 (half of the estimated lane width 26 representing the same lane 20 plus the estimated lane width 26 of the adjacent lane 46). Therefore, if the offset distance 42 greater than half of the estimated lane width 26 and less than 1.5 times the estimated lane width 26, the object 14 is in the adjacent lane 46. However, if the offset distance 42 is greater than 1.5 times the estimated lane width 26, the object 14 is not in the adjacent lane 46.

The alert generation module 214 receives the relative lane assignment of the object 14 and generates an alert signal in response to the object 14 being in the same lane 20 as the vehicle 110. Alternatively, if the object 14 is not in the same lane 20 as the vehicle 110, the alert generation module 214 does not generate the alert signal. The alert generation module 214 can send the alert signal to the driver warning device 128, a haptic actuator module 236, the brake actuator module 170, and/or the steering actuator module 180, as discussed above. The alert generation module 214 sends the alert signal when the object 14 is in the same lane 20 as the vehicle 110. However, where the alert signal is sent may depend on the distance between the vehicle location 18 and the object location 16. That is, the alert generation module 214 sends a signal to the driver warning device 128, the haptic actuator module 236, the brake actuator module 170, and/or the steering actuator module 180 according to the distance between the vehicle location 18 and the object location 16.

The alert generation module 214 defines a first distance, a second distance, a third distance, and a fourth distance based on a relative speed difference between the vehicle 110 and the object 14. Alternatively, the distances may vary based on the closing speed or the distance between the vehicle location 18 and the object location 16. For example, the alert generation module 214 can define the first distance as 5 feet, the second distance as 10 feet, the third distance as 15 feet, and the fourth distance as 20 feet.

The relative speed module 216 receives the object location 16 and the object speed from the object location module 208. The object speed may be determined from the camera 184 or the laser 186. The relative speed module 216 also receives the vehicle speed from the one or more wheel speed sensors 182 and the vehicle location 18 from the GPS module 131. The relative speed module 216 can calculate the relative speed difference based on the object location 16, the object speed, the vehicle location 18, and the vehicle speed. The alert generation module 214 receives the relative speed difference between the vehicle 110 and the object 14 from the relative speed module 216 to determine the distances.

In response to the vehicle location 18 being within the first distance (for example, 5 feet) of the object location 16, the alert generation module sends the alert signal to the brake actuator module 170 to actuate the friction brakes 125 and slow the vehicle 110.

In another implementation, in response to the vehicle location 18 being within the second distance (for example, 10 feet) of the object location 16, the alert generation module 214 sends the alert signal to the steering actuator module 180 to change the trajectory of the vehicle 110. For example, in the case of an autonomous vehicle, the steering actuator module 180 may direct the vehicle 110 into the adjacent lane to avoid the object 14. In this way, the DCM 130 can track the object 14 in front of the vehicle and plan trajectories of the vehicle 110 based on the object location 16. Additionally, the DCM 130 can adjust the vehicle speed according to the object location 16 as well as the object speed.

In another implementation, the alert generation module 214 can send the alert signal to the haptic actuator module 236 to actuate a vibrator on the steering wheel 172 to vibrate, providing haptic feedback to the driver. In response to the object location 16 being within the third distance (for example, 15 feet) of the vehicle location 18, the alert generation module 214 may send the alert signal to the haptic actuator module 236.

In another implementation, the alert generation module 214 can send the alert signal to the driver warning device 128 to provide visual or audio feedback to the driver. For example, when the vehicle location 18 is within the fourth distance (for example, 20 feet) of the object location 16, the alert generation module 214 sends the alert signal to the driver warning device 128. In response to receiving the alert signal, the driver warning device 128 illuminates a light indicator or provides audio feedback, such as a beeping sound, indicating that the vehicle location 18 is within the fourth distance of the object location 16.

In some implementations, the alert generation module 214 generates an adjacent alert signal in response to the object placement module 232 determining the object 14 is in the adjacent lane 46 and the object location 16 is within the second distance (for example, 10 feet) of the vehicle location 18. The alert generation module 214 can send the adjacent lane signal to the driver warning device 128 to indicate to the driver, with visual or audio feedback, that the object 14 is in the adjacent lane 46 and the object location 16 is within the second distance of the vehicle location 18.

Figure 5:
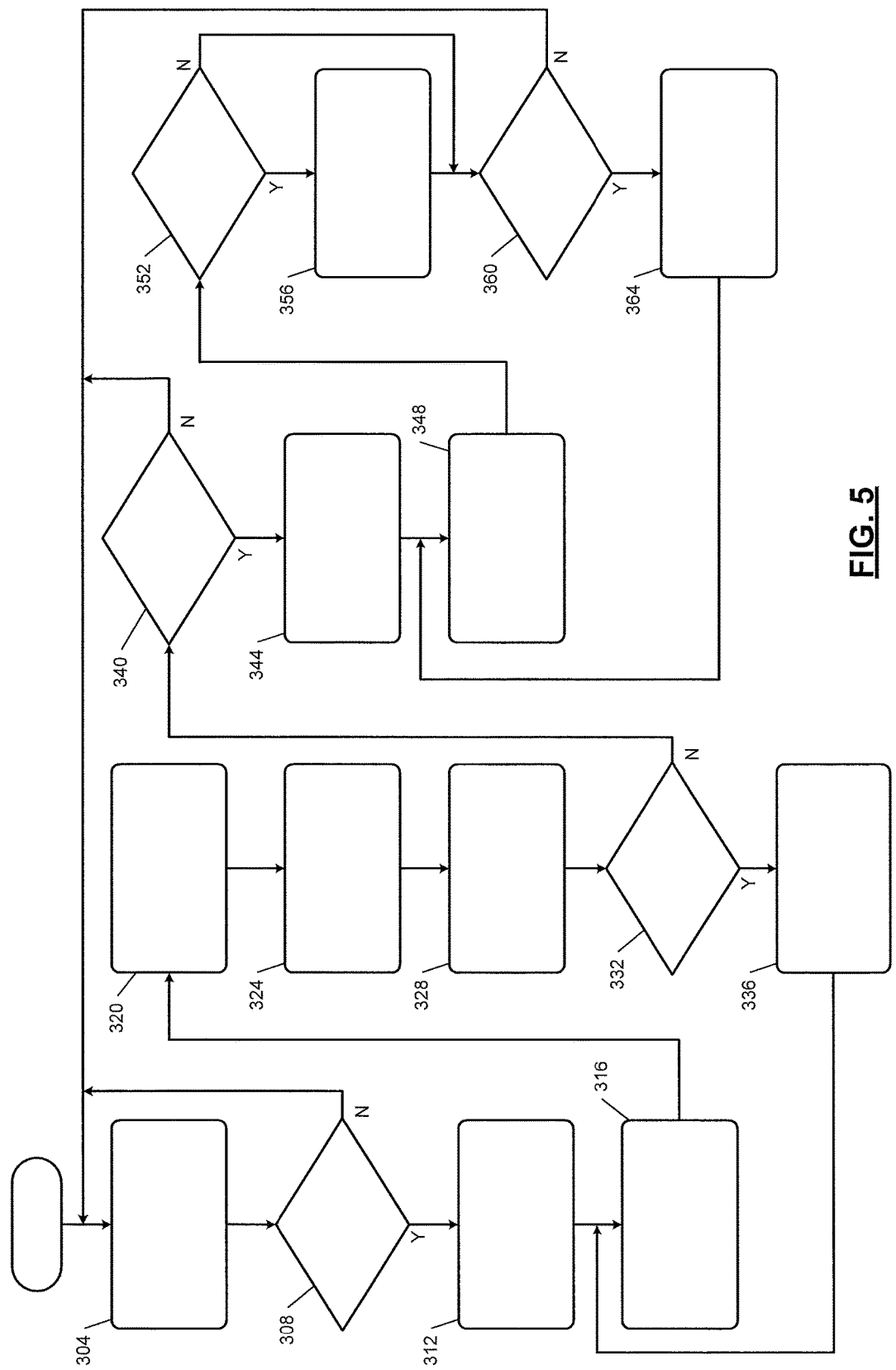
FIG. 5 is a flowchart depicting example operation of a DCM.

In FIG. 5, a flowchart depicting example operation of the DCM 130 is shown. As discussed above, the DCM 130 determines whether the object 14 is in the same lane 20 as the vehicle 110 and generates the alert signal in response to the object 14 being in the same lane 20 as the vehicle 110. Control begins at 304, where the object location module 208 identifies objects in front of the vehicle 110. At 308, the object location module 208 determines whether at least one object was identified. If 308 is true, control continues to 312. If 308 is false, control returns to 304. At 312, control selects the first object, in this case the object 14, of the at least one identified objects. Control then continues to determine whether the selected object 14 is in the same lane 20 as the vehicle 110.

At 316, the vehicle placement module 204 receives the vehicle location 18 from the GPS module 131. At 320, the vehicle placement module 204 determines the lane 20 of the vehicle 110 based on information stored in the map database 200.

At 324, the distance determination module 220 calculates the distance between the selected object location 16 and the vehicle location 18. At 328, the lane assignment module 212 determines the lane the selected object 14 is in with respect to the vehicle 110. The lane determination of the selected object 14 is described in FIG. 6.

At 332, control determines whether the object location module 208 has identified another object in front of the vehicle 110. If 332 is true, control selects the next object at 336 and returns to 316 to update the vehicle location 18. If 332 is false, control continues to 340 to determine if any of the identified objects are in the same lane 20 as the vehicle 110. If 340 is false and no identified objects are in the same lane 20 as the vehicle 110, control returns to the beginning at 304 to identify objects in front of the vehicle 110. However, if 340 is true, control selects the first object in the same lane 20 as the vehicle 110.

At 348, control determines a threshold separation between the vehicle location 18 and the object location 16. The threshold separation is indicative of a minimum distance between the object location 16 and the vehicle location 18 where the DCM 130 would produce some form of an alert to the driver. For example, the threshold separation can be 20 feet. That is, once the vehicle 110 is within 20 feet of the object 14, the DCM 130 will notify the driver of the vehicle location 18 with respect to the object 14.

In some implementations, the threshold separation can depend on the vehicle speed. That is, when the vehicle 110 is travelling at a higher speed, the threshold separation can be larger as more stopping distance is required with the higher speed.

At 352, control determines whether the distance between the object location 16 and the vehicle location 18 (previously calculated by the distance determination module 220 at 324) is less than the threshold separation. If 352 is true, control continues to 356 and the alert generation module 214 generates the alert signal, further described in FIG. 7. After generating the alert signal at 356, control continues to 360 to determine whether another identified object is in the same lane 20 as the vehicle 110. Additionally, if 352 is false, control continues to 360. If 360 is true, control selects the next identified object in the same lane 20 as the vehicle 110 and returns to 348 to determine the threshold separation. If 360 is false, control returns to the beginning at 304 to identify objects in front of the vehicle 110.

Figure 6:
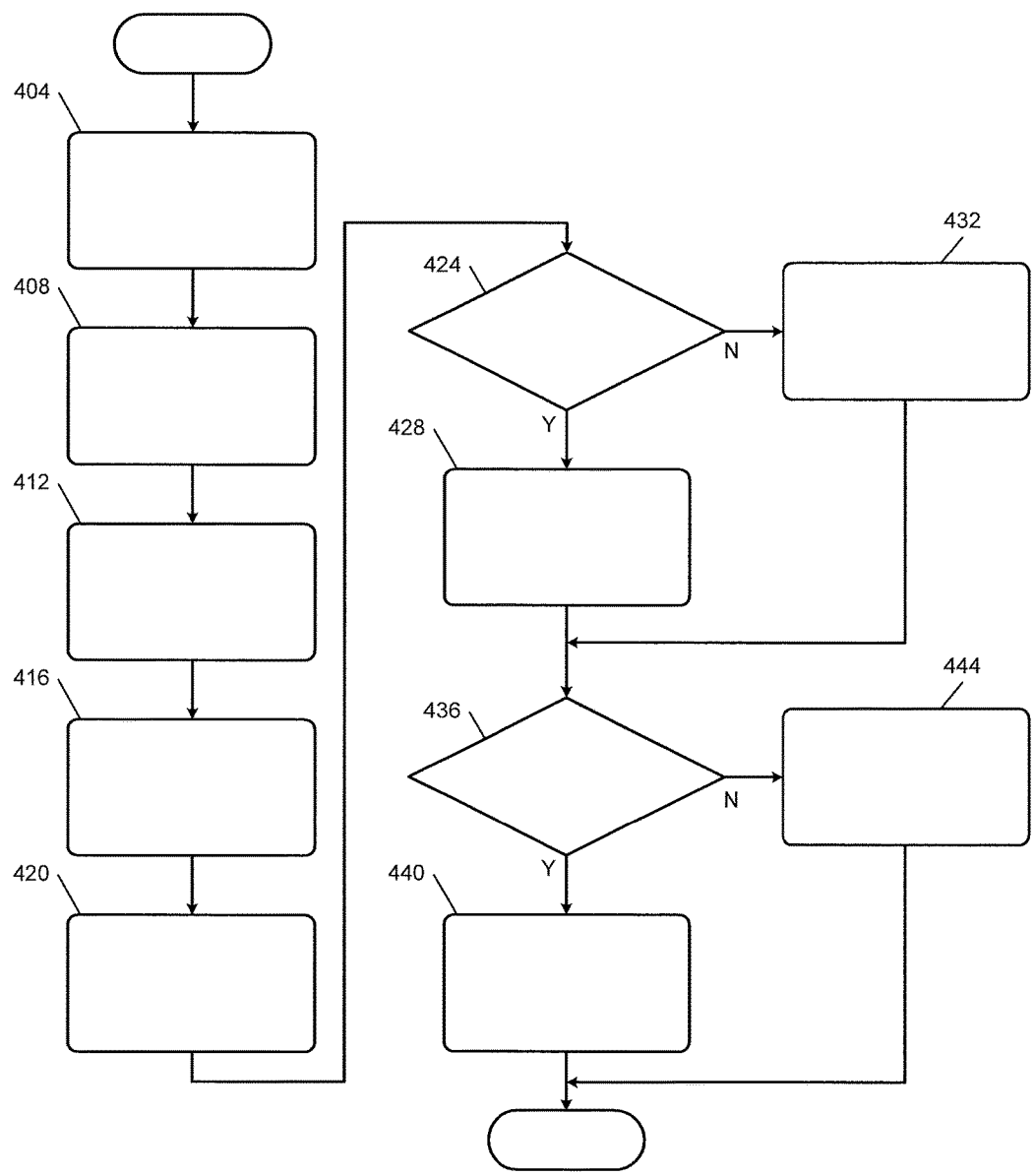
FIG. 6 is a flowchart depicting example operation of a lane assignment module.

In FIG. 6, a flowchart depicting example operation of the lane assignment module 212 is shown. To determine which lane the selected object 14 is in, control begins at 404. At 404, the curvature plotting module 224 plots the curvature line 30 along the center of the lane 20 of the vehicle 110. At 408, control calculates the distance along the x-axis $|x_o-x_v|$ between the selected object location 16 and the vehicle location 18, which is used in equation 1. At 412, the width determination module 228 locates the point 34 along the curvature line 30 that is closest to the selected object 14.

At 416, the width determination module 228 calculates the offset distance 42 between the point 34 and the object location 16. At 420, the width determination module 228 calculates the total distance along the curvature line 30 between the vehicle location 18 and the point 34. At 424, control determines whether the total distance is less than the first threshold distance, for example, 90 meters. If 424 is true, control continues to 428 where the width determination module 228 calculates the estimated lane width 26 at the point 34 using equation 1. If 424 is false, control continues to 432. At 432, the width determination module 228 calculates the estimated lane width 26 at the point 34 using equation 2.

Alternatively, the first threshold distance to determine which equation to use can be closer or farther. Additionally, in alternative embodiments, more than two equations may be used to calculate the estimated lane width 26. For example, different equations may be used at different distance intervals to increase the accuracy of the estimated lane width 26. As described above, in an alternative implementation, control could calculate the estimated lane width 26 using both equation 1 and equation 2 and select the estimated lane width 26 that is larger.

Once the estimated lane width 26 is calculated at 428 or 432, control continues to 436 to determine whether the offset distance 42 is less than half of the estimated lane width 26. As previously discussed, the estimated lane width 26 represents the entire width of the lane 20. Since the offset distance 42 is measured from the center of the lane 20, the offset distance 42 is compared to half of the estimated lane width 26. If 436 is true, at 440, the object placement module 232 determines that the selected object 14 is in the same lane 20 as the vehicle 110. If 436 is false, at 444, the object placement module 232 determines that the selected object 14 is not in the same lane 20 as the vehicle 110. When the selected object 14 is in the same lane 20 as the vehicle 110, the alert generation module 214 generates the alert signal.

Figure 7:
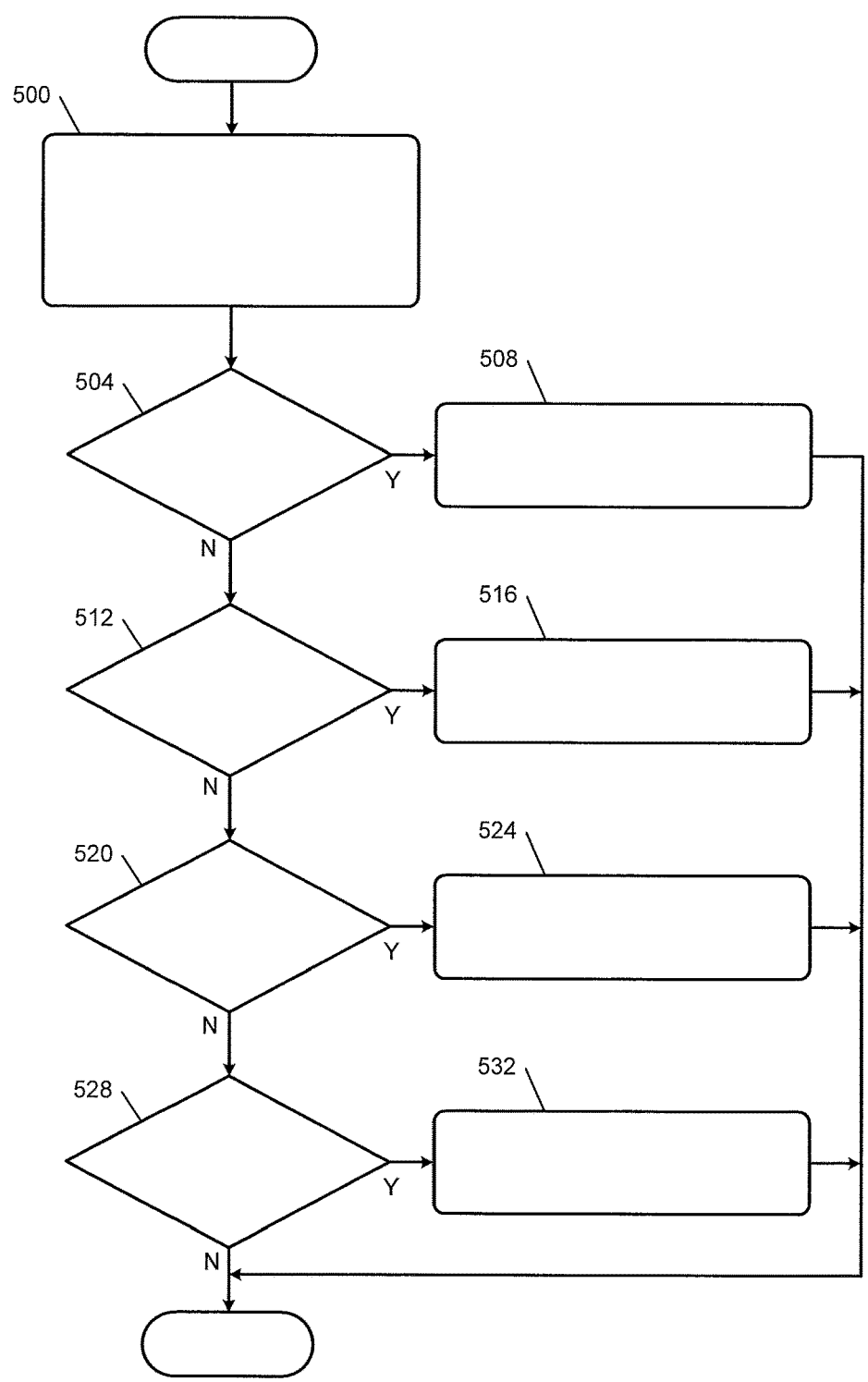
FIG. 7 is a flowchart depicting example operation of an alert generation module.

In FIG. 7, a flowchart depicting example operation of the alert generation module 214 is shown. As described with respect to FIG. 5, the alert generation module 214 generates the alert signal when the selected object 14 is in the same lane 20 as the vehicle 110 and the distance between the selected object location 16 and the vehicle location 18 is less than the threshold separation.

Control begins at 500, where the alert generation module 214 defines the first distance, the second distance, the third distance, and the fourth distance based on a relative speed difference between the vehicle 110 and the object 14. For example, the alert generation module 214 can define the first distance as 5 feet, the second distance as 10 feet, the third distance as 15 feet, and the fourth distance as 20 feet.

Once the distances are defined, control continues to 504, where the alert generation module 214 determines whether the selected object location 16 is within the first distance of the vehicle location 18. If the selected object location 16 is within the first distance of the vehicle location 18, at 508, the alert generation module 214 sends the alert signal to the brake actuator module 170 to actuate the friction brakes 125 of the vehicle 110. If 504 is false, control continues to 512 to determine if the selected object location 16 is within the second distance of the vehicle location 18. If 512 is true, control continues to 516 where the alert generation module 214 sends the alert signal to the steering actuator module 180 to change the trajectory of the vehicle 110.

If 512 is false, control continues to 520 to determine if the selected object location 16 is within the third distance of the vehicle location 18. If 520 is true, at 524, the alert generation module 214 sends the alert signal to the haptic actuator module 236 to actuate the vibrator on the steering wheel 172, providing haptic feedback to the driver.

If 520 is false, control continues to 528 to determine if the vehicle location 18 is within the fourth distance of the selected object location 16. If 528 is true, the alert generation module 214 sends the alert signal to the driver warning device 128 to illuminate a light indicator. Alternatively, the driver warning device 128 can provide audio feedback, such as a beeping sound. If 528 is false, control ends, providing no feedback to the driver as the selected object location 16 is more than the fourth distance from the vehicle location 18. In some implementations, the driver warning device 128 always provides visual or audio feedback to the driver when the selected object location 16 is in the same lane 20 as the vehicle location 18.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system for a vehicle operating on a road, the system comprising:
 a vehicle placement module configured to, based on a geographic position of the vehicle, reference a road mapping database to identify a selected lane of the road, wherein the vehicle is located within the selected lane;
 a lane assignment module configured to (i) receive information indicating identification of an object in the road and (ii) determine a relative lane of the object with respect to the selected lane, wherein the lane assignment module includes:
  a curvature plotting module configured to, based on the road mapping database, determine a curvature line of the selected lane; and
  an object placement module configured to (i) determine a first distance value representing a shortest distance between the object and the curvature line and (ii) determine whether the relative lane of the object is the selected lane based on the first distance value and a lane width value; and
 an alert generation module configured to selectively generate an alert signal in response to the object being in the selected lane,
wherein:
the alert generation module is configured to send the alert signal to at least one of:
 a brake actuator module configured to actuate brakes of the vehicle to slow the vehicle in response to the alert signal;
 a steering actuator module configured to change a trajectory of the vehicle to move the vehicle into an adjacent lane in response to the alert signal;
 a haptic actuator module configured to actuate a vibrator sensor attached to a steering wheel of the vehicle in response to the alert signal; and
 a driver warning device configured to alert a driver of the vehicle to a collision risk in response to the alert signal;

the lane assignment module further includes a width determination module configured to calculate the lane width value of the selected lane at a first point on the curvature line,
the width determination module is configured to selectively calculate: (i) a second distance value representing a distance between the geographic position of the vehicle and the first point and (ii) the lane width value based on the second distance value,
the width determination module is configured to calculate the lane width value according to (i) a first equation in response to a first condition being met and (ii) a second equation in response to a second condition being met;
the first equation is based on a location of the vehicle along an x-axis, a location of the object along the x-axis, a distance gain value, a distance coefficient value, and a curve gain value;
the x-axis is tangential to the curvature line at the first point; and
the second equation is based on a predetermined distance, the distance gain value, the distance coefficient value, and the curve gain value.

2. The system of claim 1 wherein a point along the curvature line that is closest to the object is selected as the first point.

3. The system of claim 1 wherein:
the first equation is $$W = \left(\frac{|x_o - x_v| \times g_{dist}}{k_{dist}}\right) \times g_{curve};$$

the second equation is $$W = \left(\frac{d_{fixed} \times g_{dist}}{k_{dist}}\right) \times g_{curve};$$

W is the lane width value;
$x_v$ is the location of the vehicle along the x-axis;
$x_o$ is the location of the object along the x-axis;
$d_{fixed}$ is the predetermined distance;
$g_{dist}$ is the distance gain value;
$g_{curve}$ is the curve gain value; and
$k_{dist}$ is the distance coefficient value.

4. The system of claim 3 wherein:
$d_{fixed}$, $g_{dist}$, and $k_{dist}$ are predetermined constants; and
$g_{curve}$ is determined based on the second distance value.

5. The system of claim 1 wherein the width determination module is configured to calculate the lane width value according to:
the first equation when the second distance value is less than a first threshold distance; and
the second equation when the second distance value is greater than a second threshold distance.

6. The system of claim 1 wherein the vehicle placement module is configured to identify the selected lane of the road by:
 referencing the road mapping database to determine a lane width of the road;
 calculating a vehicle offset distance representing a shortest distance between the geographic position of the vehicle and the curvature line; and
 determining the selected lane based on the vehicle offset distance and the lane width of the road, wherein the vehicle is in the selected lane in response to the vehicle offset distance being less than the lane width of the road.

7. The system of claim 1 wherein the object placement module is configured to determine the object is in the selected lane in response to the first distance value being less than half of the lane width value.

8. The system of claim 1 wherein the object placement module is configured to determine the object is in an adjacent lane in response to the first distance value being greater than half of the lane width value and less than 1.5 times the lane width value.

9. The system of claim 1 further comprising:
an object location module configured to identify the object in the road and determine (i) an object location and (ii) an object velocity; and
the alert generation module is configured to generate the alert signal in response to (i) the object being in the selected lane and (ii) a closing speed of the vehicle and the object exceeding a closing speed threshold.

10. The system of claim 9 wherein:
the object location module is configured to receive data from at least one of (i) a camera, (ii) a laser, and (iii) a radar; and
the data includes the object location and the object velocity.

11. The system of claim 1, wherein the alert generation module is configured to, in response to the vehicle being in the selected lane:
send the alert signal to the brake actuator module in response to the vehicle being within a first distance of the object;
send the alert signal to the steering actuator module in response to the vehicle being within a second distance of the object;
send the alert signal to the haptic actuator module in response to the vehicle being within a third distance of the object; and
send the alert signal to the driver warning device in response to the vehicle being within a fourth distance of the object,
wherein the first distance is less than the second distance, the second distance is less than the third distance, and the third distance is less than the fourth distance.

12. The system of claim 1 further comprising a global navigation satellite system (GNSS) configured to determine the geographic position of the vehicle.

13. A method for a vehicle operating on a road, the method comprising:
referencing a road mapping database based on a geographic position of the vehicle to identify a selected lane of the road, wherein the vehicle is located within the selected lane;
receiving information indicating identification of an object in the road;
determining a curvature line of the selected lane based on the road mapping database;
determining a first distance value representing a shortest distance between the object and the curvature line;
determining whether a relative lane of the object is the selected lane based on the first distance value and a lane width value; and
selectively generating an alert signal in response to the object being in the selected lane;
sending the alert signal to at least one of:

a brake actuator module configured to actuate brakes of the vehicle to slow the vehicle in response to the alert signal;
a steering actuator module configured to change a trajectory of the vehicle to move the vehicle into an adjacent lane in response to the alert signal;
a haptic actuator module configured to actuate a vibrator sensor attached to a steering wheel of the vehicle in response to the alert signal; and
a driver warning device configured to alert a driver of the vehicle to a collision risk in response to the alert signal;
calculating the lane width value of the selected lane at a first point on the curvature line; and
selectively calculating: (i) a second distance value representing a distance between the geographic position of the vehicle and the first point and (ii) the lane width value based on the second distance value,
wherein:
the lane width value is calculated according to (i) a first equation in response to a first condition being met and (ii) a second equation in response to a second condition being met;
the first equation is based on a location of the vehicle along an x-axis, a location of the object along the x-axis, a predetermined distance gain value, a distance coefficient value, and a curve gain value;
the x-axis is tangential to the curvature line at the first point; and
the second equation is based on a predetermined distance, the predetermined distance gain value, the distance coefficient value, and the curve gain value.

14. The method of claim 13 a point along the curvature line that is closest to the object is selected as the first point.

15. The method of claim 13 wherein:
the lane width value is calculated according to the first equation when the second distance value is less than a first threshold distance;
the lane width value is calculated according to the second equation when the second distance value is greater than a second threshold distance;
the first equation is $$W = \left(\frac{|x_o - x_v| \times g_{dist}}{k_{dist}}\right) \times g_{curve};$$

the second equation is $$W = \left(\frac{d_{fixed} \times g_{dist}}{k_{dist}}\right) \times g_{curve};$$

W is the lane width value;
$x_v$ is the location of the vehicle along the x-axis;
$x_o$ is the location of the object along the x-axis;
$d_{fixed}$ is the predetermined distance;
$g_{dist}$ is the predetermined distance gain value;
$g_{curve}$ is the curve gain value;
$k_{dist}$ is the distance coefficient value; and
the curve gain value is determined based on the second distance value.

16. The method of claim 13 further comprising determining the object is in the selected lane in response to the first distance value being less than half of the lane width value.

17. The method of claim 13 further comprising determining the object is in an adjacent lane in response to the first distance value being greater than half of the lane width value and less than 1.5 times the lane width value.

18. The method of claim 13 further comprising:
   identifying the object in the road;
   determining (i) an object location and (ii) an object velocity; and
   generating the alert signal in response to (i) the object being in the selected lane and (ii) a closing speed of the vehicle and the object exceeding a closing speed threshold.

* * * * *